(12) United States Patent
Hamada (10) Patent No.: US 11,072,514 B2
(45) Date of Patent: Jul. 27, 2021

(54) FLAT CABLE WINDING DEVICE AND METHOD OF ASSEMBLING SAME

(71) Applicant: YAZAKI CORPORATION, Tokyo (JP)

(72) Inventor: Ryo Hamada, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 188 days.

(21) Appl. No.: 16/512,760

(22) Filed: Jul. 16, 2019

(65) Prior Publication Data

US 2020/0055690 A1    Feb. 20, 2020

(30) Foreign Application Priority Data

Aug. 20, 2018  (JP) .............................. JP2018-153958

(51) Int. Cl.
*H02G 11/02*    (2006.01)
*B65H 75/48*    (2006.01)

(52) U.S. Cl.
CPC .......... *B65H 75/486* (2013.01); *H02G 11/02* (2013.01)

(58) Field of Classification Search
CPC ...... B65H 75/44; B65H 75/48; B65H 75/486; H02G 11/02
See application file for complete search history.

(56) References Cited

U.S. PATENT DOCUMENTS

| | | |
|---|---|---|
| 2001/0048044 A1 | 12/2001 | Sugata |
| 2006/0057863 A1 | 3/2006 | Araki et al. |
| 2014/0353415 A1* | 12/2014 | Katsuramaki .......... H02G 11/02 242/371 |
| 2015/0001327 A1* | 1/2015 | Hamada ................. B65H 75/48 242/376 |
| 2016/0013627 A1* | 1/2016 | Katsuramaki .......... H02G 11/02 242/377 |
| 2019/0382230 A1* | 12/2019 | Hamada ............. B65H 75/4455 |
| 2020/0055690 A1* | 2/2020 | Hamada ................. H02G 11/02 |

FOREIGN PATENT DOCUMENTS

| | | |
|---|---|---|
| DE | 10 2010 022 542 A1 | 12/2011 |
| JP | 6-191740 A | 7/1994 |
| JP | 2001-341945 A | 12/2001 |
| JP | 2006-86044 A | 3/2006 |
| JP | 2014-113019 A | 6/2014 |
| JP | 2015-126615 A | 7/2015 |

* cited by examiner

*Primary Examiner* — Sang K Kim (74) *Attorney, Agent, or Firm* — Kenealy Vaidya LLP (57) ABSTRACT

A flat cable winding device includes: a base plate in which a central shaft for holding one end side of the flat cable is erected on the center of the upper surface; a rotation table disposed on an upper surface of the base plate and rotatably supported around the central shaft; a spiral spring for rotationally energizing the rotation table in the winding direction of the flat cable since the energizing member is interposed between the base plate and the rotation table; and a tubular wall body mounted on the base plate while the spiral spring and the rotation table are accommodated therein, wherein a rib is formed on an inner periphery wall surface of the tubular wall body for preventing the rotation table from popping out of the base plate.

3 Claims, 7 Drawing Sheets

FLAT CABLE WINDING DEVICE AND METHOD OF ASSEMBLING SAME

CROSS REFERENCE TO RELATED APPLICATIONS

This application is based on and claims priority from Japanese patent application No. 2018-153958 filed on Aug. 20, 2018, the entire contents of which are incorporated herein by reference.

BACKGROUND OF THE INVENTION

1. Technical Field

The present invention relates to a flat cable winding device and a method of assembling the same.

2. Background Art

For example, a flat cable is often used for wiring between a vehicle body and a slide member such as a slide sheet or a slide door of an automobile. In the flat cable used in this application, an extra length is generated with the sliding operation of the slide member. Therefore, in order to absorb the extra length, a flat cable winding device is provided.

The flat cable winding device is installed, for example, on the vehicle body side, and the flat cable is wound up or fed along with the sliding of the slide member so that the flat cable cannot be loosened excessively.

Figure 7:
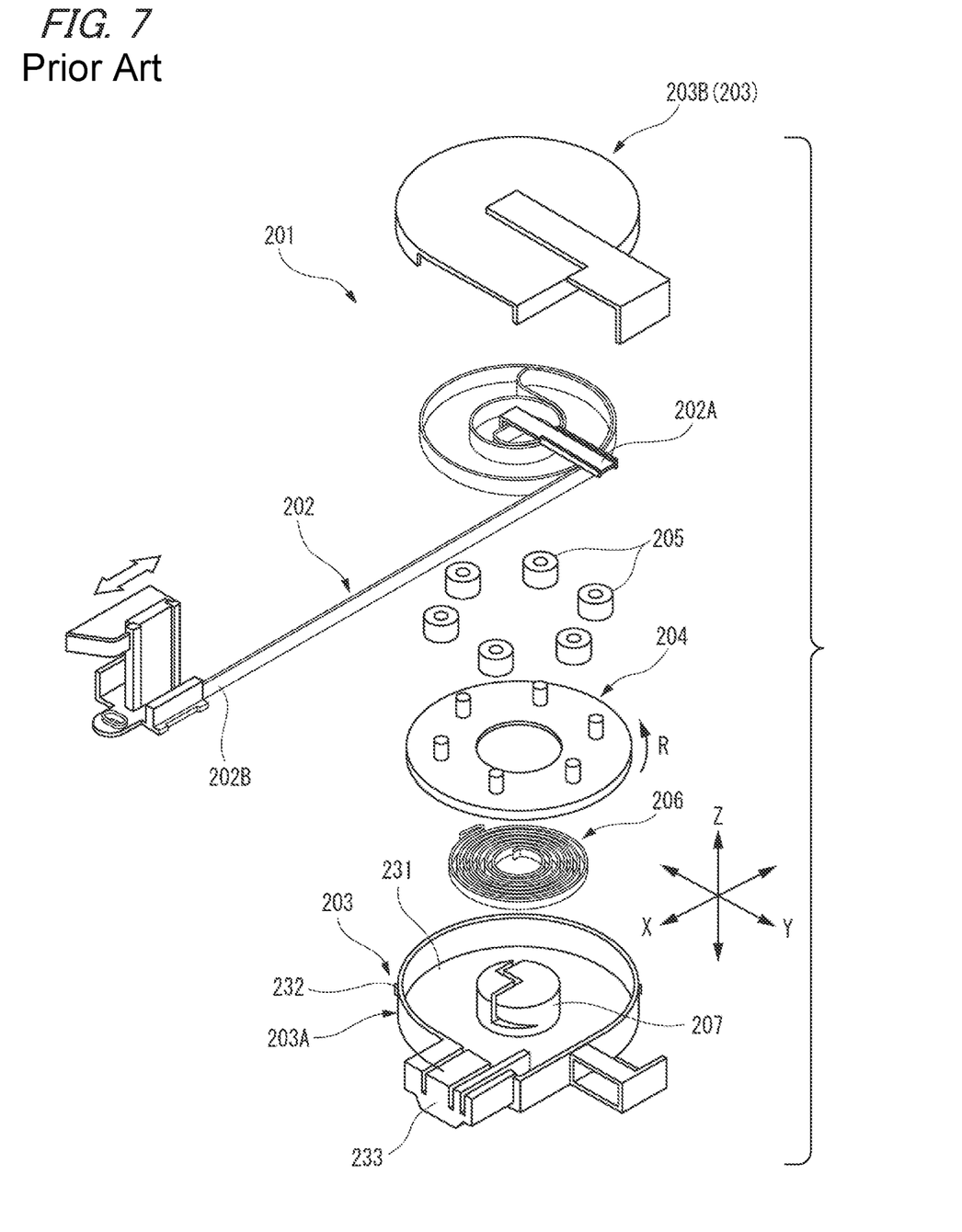
FIG. 7 is an exploded perspective view of a conventional flat cable winding device.

An example of the flat cable winding device disclosed in Patent Literature 1 is known. FIG. 7 is an exploded perspective view of the flat cable winding device described in JP-A-2014-113019.

One end 202A of the flat cable 202 is connected to the vehicle body floor side, and the other end 202B thereof is connected to the slide member side. A flat cable winding device 201 includes a case 203 accommodating the wound flat cable 202, a rotation table 204 rotatably supported in the case 203, a plurality of guide rollers 205 rotatably supported on the rotation table 204, and a spiral spring 206 disposed between the bottom plate 231 of the case 203 and the rotation table 204. One end of the spiral spring 206 is locked to the case 203, and the other end is locked to the rotation table 204 to apply a rotation energizing force in the winding direction R to the rotation table 204.

The case 203 includes a bottomed tubular lower case 203A that integrally includes a bottom plate 231 and a cylindrical wall 232, and an upper case 203E that closes an upper surface opening of the lower case 203A. A center shaft 207 for rotatably supporting the rotation table 204 is erected on the center of the upper surface of the bottom plate 231 of the lower case 203A. The cylindrical wall 232 of the lower case 203A is provided with a cable insertion portion 233 for introducing and removing the flat cable 202.

When the flat cable winding device 201 is assembled, first, the spiral spring 206 is attached to the lower surface side of the rotation table 204. Next, the spiral spring is assembled to the lower case 203A. Then, after the rotation table 204 is rotated to store the energizing force in the spiral spring 206, the rotation table 204 is stopped from rotating. A plurality of guide rollers 205 are attached to the rotation table 204 before and after that. Then, while the one end 202A side of the flat cable 202 is assembled to the center shaft 207, the flat cable 202 is routed in a predetermined path, and the other end 202B side of the flat cable 202 is removed from the cable insertion portion 233 to the outside of the case 203.

In this state, the rotation stop of the rotation table 204 is removed. Then, as the plurality of guide rollers 205 rotate in the winding direction R of the rotation table 204 energized by the spiral spring 206, the flat cable 202 introduced into the case 203 from the cable insertion portion 233 is wound around the outer periphery of the plurality of guide rollers 205 as an outer winding portion. At the same time, one of the plurality of guide rollers 205 is an inversion roller, and the flat cable 202 introduced from the cable insertion portion 233 is inverted toward the central shaft 207, and wound around the central shaft 207 as an inner winding portion.

In this way, when an extra length is generated in the flat cable 202 according to the sliding operation of the slide member, the flat cable 202 is wound by the force of the spiral spring 206. When the pulling force acts on the flat cable 202 according to the sliding operation of the slide member, the rotation table 204 rotates in the opposite direction to the winding direction R against the force of the spiral spring 206. As a result, the flat cable 202 wound as the outer winding portion and the inner winding portion is fed out to the outside of the case 203.

SUMMARY

Incidentally, the spiral spring 206 mainly exerts an energizing force in the rotational direction in a plane (in the X-Y plane) parallel to the plate surface of the rotation table 204. However, for example, in the process of assembly, the balance may be lost due to some factor in a state in which the energizing force is stored in the spiral spring 206. In this case, a rotational force around the X axis or the Y axis may be generated in the spiral spring 206. As a result, the force stored in the spiral spring 206 also acts in the Z-axis direction, which may cause the spiral spring 206 and the rotation table 204 to pop out of the case 203.

The present invention has been made in view of the above circumstances, and an object thereof is to provide a flat cable winding device and a method of assembling the same, which can prevent the rotation table and the energizing member from popping out during assembly, for example.

In order to achieve the above object, a flat cable winding device and a method of assembling the same according to the present invention are characterized by the following (1) to (3).

(1) A flat cable winding device in which one end of a flat cable is connected and the other end side is wound so as to be able to be fed out, comprising:

a base plate in which a central shaft for holding one end side of the flat cable is erected on the center of the upper surface;

a rotation table disposed on an upper surface of the base plate and rotatably supported around the central shaft by fitting a center hole to the central shaft;

an energizing member for rotationally energizing the rotation table in the winding direction of the flat cable, with the energizing member being interposed between the base plate and the rotation table, one end being locked to the rotation table, and the other end being locked to the base plate; and a tubular wall body mounted on the base plate while the energizing member and the rotation table are accommodated therein, wherein a rib is formed on an inner periphery wall surface of the tubular wall body for preventing the rotation table from popping out of the base plate in a direction away from the base plate in a state in which the tubular wall body is fixed to the base plate.

(2) The flat cable winding device according to above (1), wherein a plurality of guide rollers for winding the flat cable by rotation of the rotation table rotationally energized by the energizing member in a winding direction are disposed on the upper surface of the rotation table along the periphery direction.

(3) A method of assembling a flat cable winding device which is a method of assembling the flat cable winding device according to above (2), comprising:

attaching the energizing member to the lower surface of the rotation table and attaching the energizing member to the base plate;

then, assembling and fixing the tubular wall body to the base plate;

in this state, rotating the rotation table in a direction opposite to the winding direction to store an energizing force in the energizing member;

attaching the plurality of guide rollers on the rotation table; an winding the flat cable around the guide rollers.

According to the flat cable winding device of the configuration of (1), the lower case is divided into two parts of the base plate and the cylindrical wall. A rib for preventing the rotation table from popping out is provided on the inner peripheral wall surface of the tubular wall body. Therefore, for example, it is possible to prevent the energizing member such as the spiral spring and the rotation table from popping out of the case that were generated in the assembly process. Therefore, the assembly work can be advanced safely and smoothly. Further, when the energizing member is assembled and transported, even when there is vibration, the energizing member and the rotation table do not pop out of the case, and the occurrence possibility of defective products can be reduced.

According to the flat cable winding device having the configuration of (2), the energizing member and the rotation table are prevented from popping out from the case, and the winding and feeding of the flat cable with respect to the winding device can be performed smoothly.

According to the assembly method of the flat cable winding device having the configuration (3), even in a state where the energizing force is stored in the energizing member, it is possible to reliably prevent the rotation table and the energizing member from popping out from the case. Therefore, the assembly work of the flat cable winding device can be advanced safely and smoothly. Further, when the energizing member is assembled and transported, even when there is vibration, the energizing member and the rotation table do not pop out of the case, and the occurrence possibility of defective products can be reduced.

According to the present invention, even in a state where the energizing force is stored in the spiral spring, it is possible to reliably prevent the rotation table or the spiral spring from popping out from the case.

The present invention has been briefly described above. Further, details of the invention will be clarified by reading a mode (hereinafter, referred to as "embodiment") for carrying out the invention to be described below with reference to accompanying drawings.

DETAILED DESCRIPTION OF EMBODIMENTS

A specific embodiment of the present invention will be described below with reference to the drawings.

Figure 1:
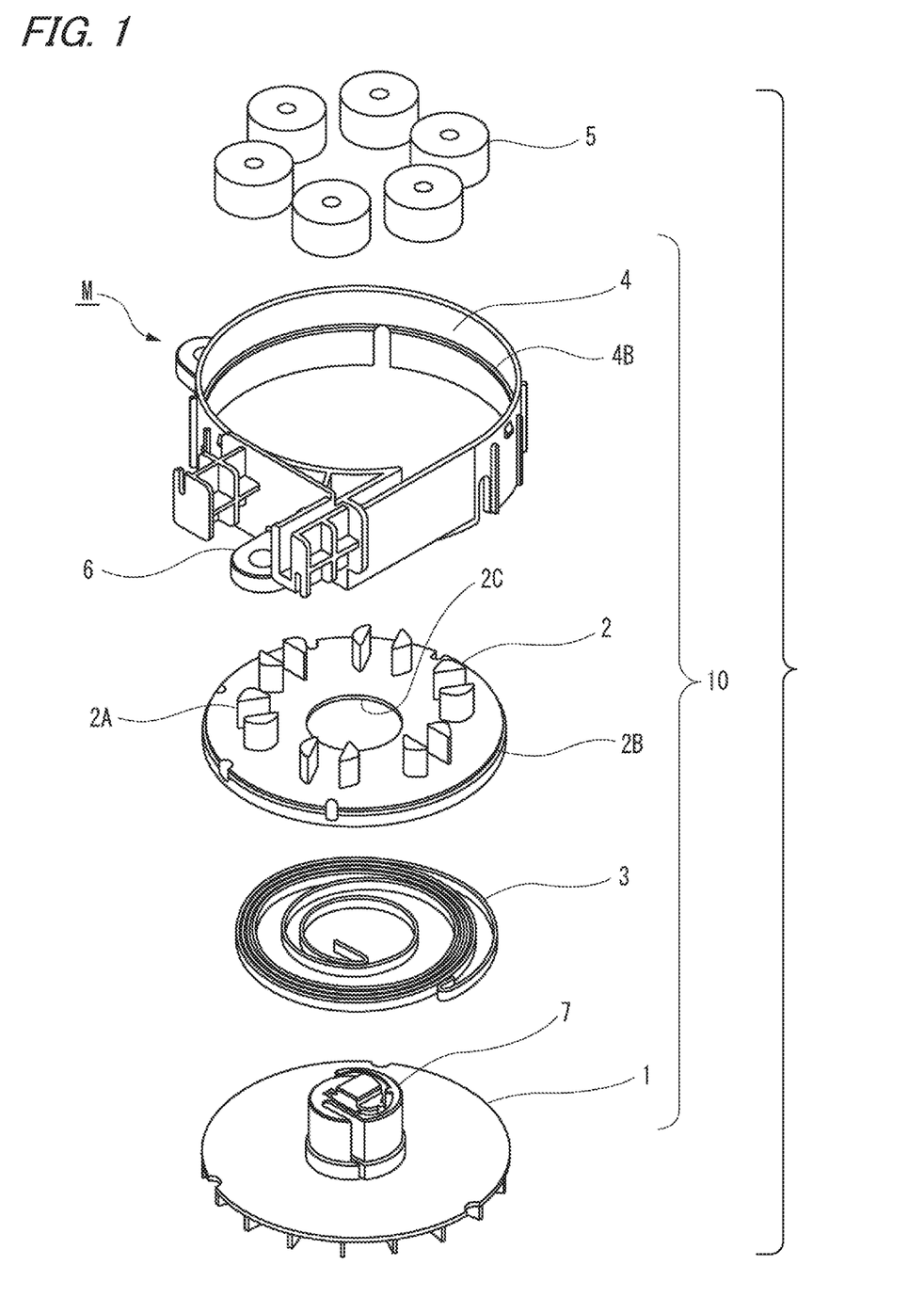
FIG. 1 is an exploded perspective view showing a main configuration of a flat cable winding device according to an embodiment of the present invention.
Figure 2:
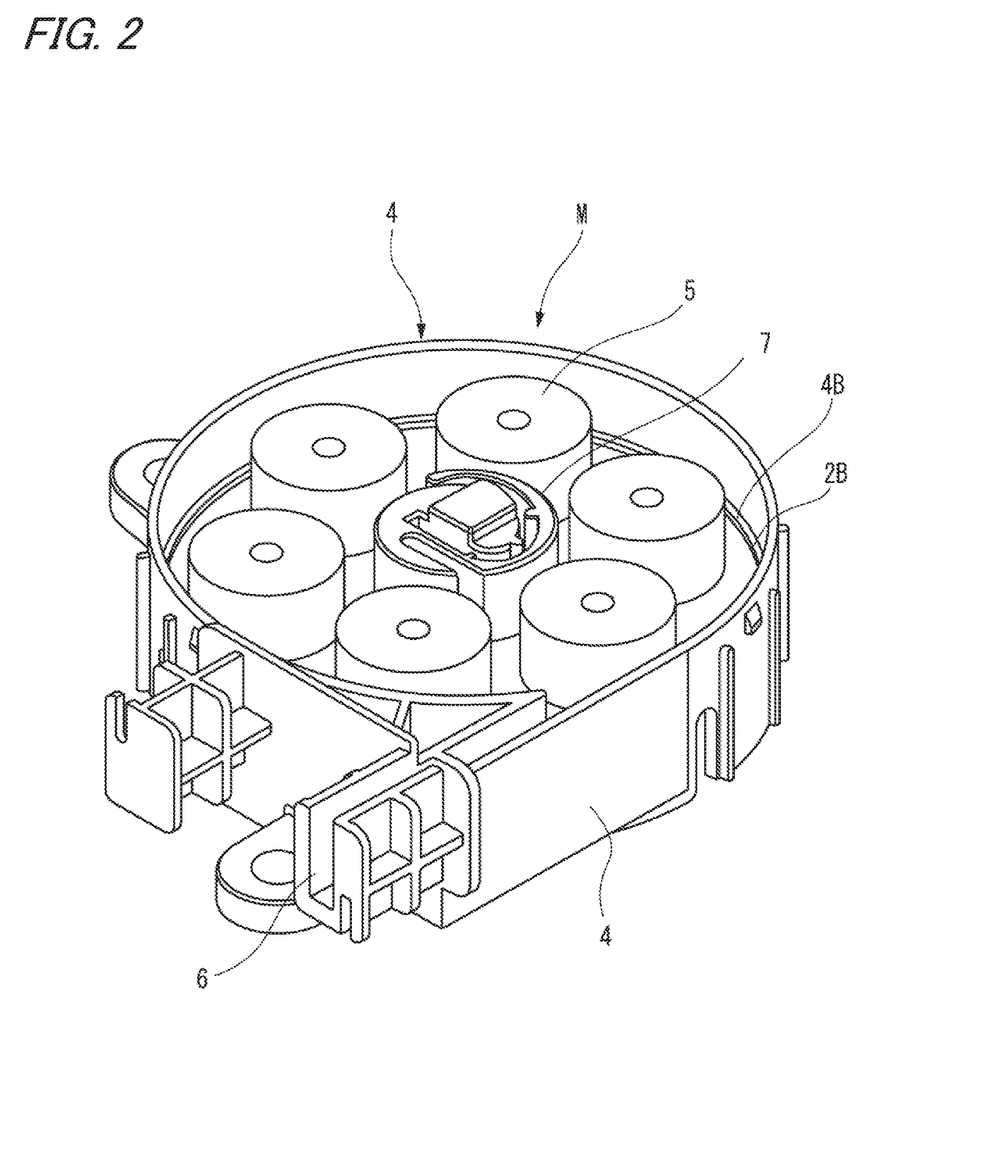
FIG. 2 is a perspective view showing the main configuration of the flat cable winding device.
Figure 3:
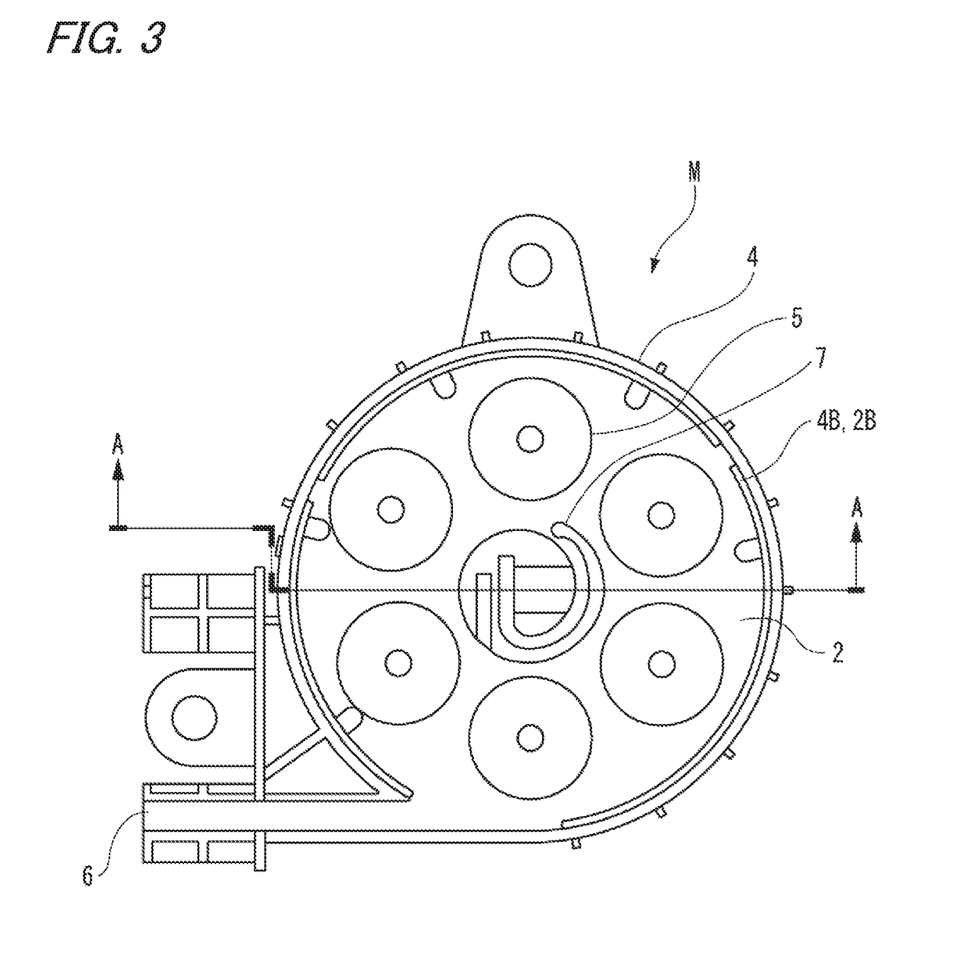
FIG. 3 is a plan view showing the main configuration of the flat cable winding device.
Figure 4:
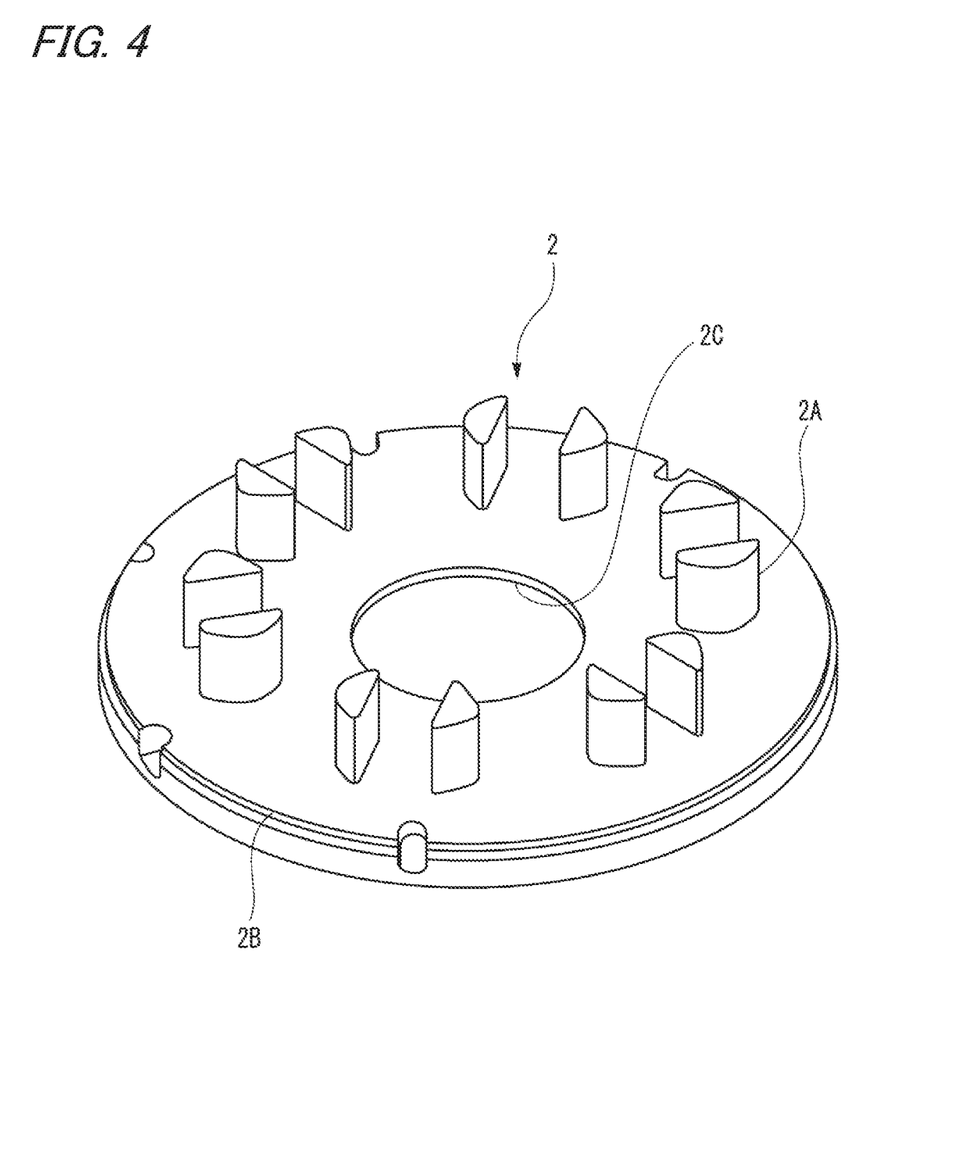
FIG. 4 is a perspective view showing a rotation table in the flat cable winding device taken out as a single piece.
Figure 5:
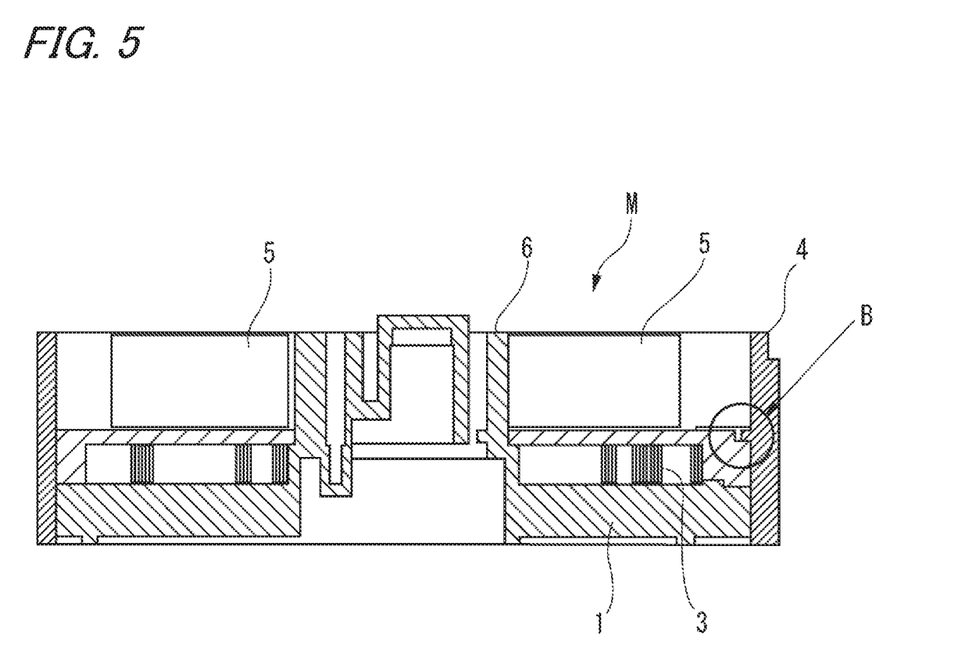
FIG. 5 is a sectional view taken along line A-A of FIG. 3.
Figure 6:
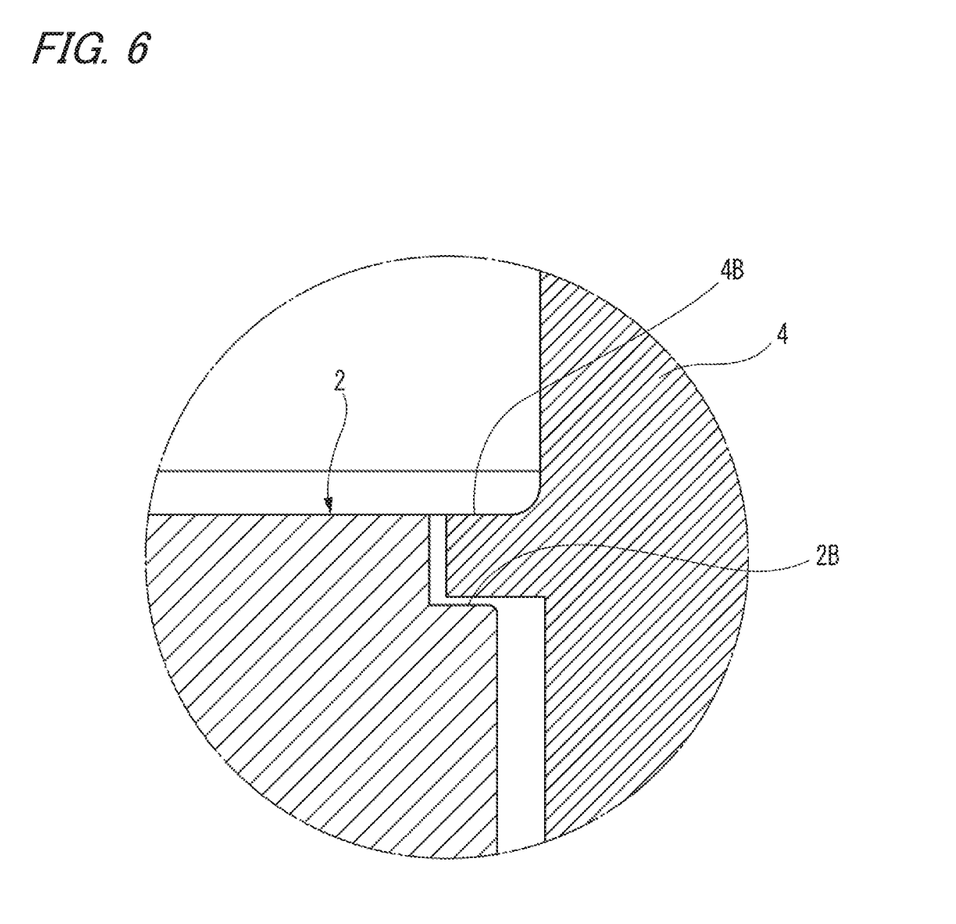
FIG. 6 is an enlarged view of a circle B in FIG. 5.

FIG. 1 is an exploded perspective view showing a main configuration of a flat cable winding device according to an embodiment of the present invention. FIG. 2 is a perspective view showing the main configuration of the flat cable winding device, and FIG. 3 is a plan view thereof. FIG. 4 is a perspective view showing a rotation table in the flat cable winding device taken out as a single piece, FIG. 5 is a sectional view taken along line A-A of FIG. 3, and FIG. 6 is an enlarged view of a circle B in FIG. 5.

The flat cable winding device of the embodiment, similar to that shown in FIG. 7, is a winding device that winds one end 202A side of the flat cable 202 (see FIG. 7) and feeds the end 202B side of the flat cable 202 (see FIG. 7), and includes a resin case that accommodates the flat cable. The case includes a lower case and an upper case, but in FIGS. 1 to 3, the upper case is omitted, and only the lower case is shown.

As shown in FIG. 1, the flat cable winding device M is characterized in that the lower case 10 is divided into two parts of a base plate 1 and a tubular wall body 4 having a cylindrical shape as a first characteristic. In addition, the flat cable winding device M includes a rotation table 2, a spiral spring 3 serving as an energizing member, and a plurality of guide rollers 5.

As shown in FIGS. 1 to 3, the base plate 1 is a disk-shaped member, and a central shaft 7 that holds one end side of the flat cable is erected on the center of the upper surface thereof. The central shaft 7 is provided with a groove for locking an inner peripheral end of the spiral spring 3 to be described later, a groove for mounting one end side of a flat cable, and the like.

The rotation table 2 is a ring plate-shaped member disposed on the upper surface of the base plate 1, and is rotatably supported around the central shaft 7 by fitting the center hole 2C to the outer periphery of the central shaft 7 of the base plate 1. Around the center hole 2C of the upper surface of the rotation table 2, a roller support portion 2A is provided at an appropriate interval in the periphery direction. As shown in FIG. 4, a notch-shaped step portion 2B is formed substantially over the entire periphery on the outer peripheral edge of the upper surface of the rotation table 2.

The spiral spring 3 is interposed between the base plate 1 and the rotation table 2, and one end (outer peripheral end) is locked to the lower surface of the rotation table 2, and the other end (inner peripheral end) is locked to the center shaft 7 of the base plate 1. As a result, the spiral spring 3 rotationally energizes the rotation table 2 in the winding direction of the flat cable.

The tubular wall body 4 having a cylindrical shape constitutes the lower case 10 together with the base plate 1, and includes a cable insertion portion 6 for introducing and removing a flat cable into a part of the peripheral wall. As a second characteristic of the present embodiment, a rib 4B in an annular shape is provided on the inner peripheral wall surface of the tubular wall body 4 along the circumferential direction.

As shown in FIG. 5, the tubular wall body 4 is mounted on the base plate 1 while accommodating the spiral spring 3 and the rotation table 2 therein. The tubular wall body 4 is fixed to the base plate 1 in this state, thereby constituting the lower case 10 together with the base plate 1. Although not shown, a fixing mechanism for fixing both the base plate 1 and the tubular wall body 4 is provided. When the tubular wall body 4 is assembled and fixed to the base plate 1 in this manner, as shown in FIGS. 5 and 6, the rib 4B protruding from the inner peripheral wall surface of the tubular wall body 4 is engaged with the step portion 2B of the outer peripheral edge of the rotation table 2, whereby the rotation table 2 is restricted so as not to protrude upward.

A guide roller 5 is rotatably assembled to each roller support portion 2A on the upper surface of the rotation table 2. The plurality of guide rollers 5 wind up the flat cable by the rotation of the rotation table 2 which is rotationally energized by the spiral spring 3 in the winding direction. At this time, of the plurality of guide rollers 5, one of the guide rollers 5 functions as an inversion roller that inverts the flat cable toward the central shaft 7.

When the flat cable winding device M is assembled, first, the spiral spring 3 is attached to the lower surface of the rotation table 2, and the outer peripheral end of the spiral spring 3 is locked to the lower surface of the rotation table 2. Next, the spiral spring is attached to the base plate 1, and the inner peripheral end of the spiral spring 3 is locked to the center shaft 7 of the base plate 1. Thereafter, the tubular wall body 4 is assembled and fixed to the base plate 1 while the rotation table 2 and the spiral spring 3 are accommodated in the tubular wall body 4. In this state, the rotation table 2 is rotated in a direction opposite to the winding direction, and the energizing force is stored in the spiral spring 3, and the rotation is stopped by using a pin or the like (not shown).

At this time, since the rib 4B protruding from the inner peripheral wall surface of the tubular wall body 4 restricts the protrusion of the rotation table 2, even when a rotational force in an unexpected direction acts on the spiral spring 3, it is possible to reliably prevent the spiral spring 3 and the rotation table 2 from popping out.

Therefore, the plurality of guide rollers 5 can be assembled to the roller support portion 2A of the rotation table 2 in a stable state in which the spiral spring 3 and the rotation table 2 do not pop out. In addition, the flat cable introduced into the lower case 10 from the cable insertion portion 6 can be smoothly rotated in a predetermined path while the one end side is engaged with the central shaft 7.

By releasing the rotation stop of the rotation table 2, the flat cable introduced from the cable insertion portion 6 can be wound around the outer periphery of the plurality of guide rollers 5 as an outer winding portion according to the rotation of the rotary table 2 energized by the spiral spring 3 in the winding direction. At the same time, by using one of the plurality of guide rollers 5 as an inversion roller, the flat cable introduced from the cable insertion portion 6 can be inverted toward the central shaft 7, and the flat cable can be wound around the central shaft 7 as the inner winding portion. It should be noted that the upper case can be attached at an appropriate timing.

In this way, when the extra length is generated in the flat cable according to the sliding operation of the slide member, the flat cable is wound by the force of the spiral spring 3. When the pulling force acts on the flat cable according to the sliding operation of the slide member, the rotation table 2 rotates in the opposite direction to the winding direction against the force of the spiral spring 3. As a result, the flat cable wound as the outer winding portion and the inner winding portion is fed out to the outside of the flat cable winding device M.

As described above, according to the flat cable winding device M of the present embodiment, the lower case 10 is divided into two parts of the base plate 1 and the tubular wall body 4. A rib 4B for preventing the rotation table 2 from popping out is provided on the inner peripheral wall surface of the tubular wall body 4. Therefore, for example, it is possible to reliably prevent the spiral spring 3 and the rotation table 2 from popping out from the lower case 10 that were generated in the assembly process. Therefore, the assembly work can be advanced safely and smoothly. Further, when the spiral spring 3 is assembled and transported, even when there is vibration, the spiral spring 3 and the rotation table 2 do not pop out from the lower case 10, and occurrence possibility of defective products can be reduced.

Examples of the object to be applied to the flat cable winding device of the embodiment include an electric wire routing device for a slide sheet, an electric wire routing device for a slide door, and a routing device for routing an electric wire to a door or a hook for rotating (opening and closing). Further, the winding device of the present invention may be used in equipment or a device including various movable parts and a routing device for routing an electric wire across a movable part as well as vehicles. Further, in the above embodiment, in order to simplify the description, the winding device M for winding one flat cable is illustrated, but the present invention can also be applied to a winding device that bundles and winds a plurality of flat cables. Further, instead of the guide roller 5, a guide member for guiding the flat cable into the tubular wall body 4 may be provided.

Here, characteristics of the flat cable winding device and the method of assembling the flat cable winding device according to the embodiment of the present invention described above will be briefly summarized in the following [1] to [3], respectively.

[1] A flat cable winding device M in which one end of a flat cable is connected and the other end side is wound so as to be able to be fed out, including:

a base plate 1 in which a central shaft 7 for holding one end side of the flat cable is erected on the center of the upper surface;

a rotation table 2 disposed on an upper surface of the base plate 1 and rotatably supported around the central shaft 7 by fitting a center hole 2C to the central shaft 7;

an energizing member (spiral spring 3) for rotationally energizing the rotation table 2 in the winding direction of the flat cable, with the energizing member being interposed between the base plate 1 and the rotation table 2, one end being locked to the rotation table 2, and the other end being locked to the base plate 1; and a tubular wall body 4 mounted on the base plate 1 while the energizing member (spiral spring 3) and the rotation table 2 are accommodated therein, wherein a rib 4B is formed on an inner periphery wall surface of the tubular wall body 4 for preventing the rotation table 2 from popping out of the base plate 1 in a direction away from the base plate 1 in a state in which the tubular wall body 4 is fixed to the base plate 1.

[2] The flat cable winding device M according to [1], wherein a plurality of guide rollers 5 for winding the flat cable by rotation of the rotation table 2 rotationally energized by the energizing member (spiral spring 3) in a winding direction are disposed on the upper surface of the rotation table 2 along the periphery direction.

[3] A method of assembling a flat cable winding device which is a method of assembling the flat cable winding device according to [2], including:

attaching the energizing member (spiral spring 3) to the lower surface of the rotation table 2 and attaching the rotation table 2 to the base plate 1;

then; assembling and fixing the tubular wall body 4 to the base plate 1;

rotating the rotation table 2 in a direction opposite to the winding direction and storing an energizing force in the energizing member (spiral spring 3);

attaching the plurality of guide rollers 5 on the rotation table 2; and winding the flat cable around the guide rollers 5.

What is claimed is:

1. A flat cable winding device in which one end of a flat cable is connected and the other end side is wound so as to be able to be fed out, comprising:

a base plate in which a central shaft for holding one end side of the flat cable is erected on the center of the upper surface;

a rotation table disposed on an upper surface of the base plate and rotatably supported around the central shaft by fitting a center hole to the central shaft;

an energizing member for rotationally energizing the rotation table in the winding direction of the flat cable, with the energizing member being interposed between the base plate and the rotation table, one end being locked to the rotation table, and the other end being locked to the base plate; and a tubular wall body mounted on the base plate while the energizing member and the rotation table are accommodated therein, wherein a rib is formed on an inner periphery wall surface of the tubular wall body for preventing the rotation table from popping out of the base plate in a direction away from the base plate in a state in which the tubular wall body is fixed to the base plate.

2. The flat cable winding device according to claim 1, wherein a plurality of guide rollers for winding the flat cable by rotation of the rotation table rotationally energized by the energizing member in a winding direction are disposed on the upper surface of the rotation table along the periphery direction.

3. A method of assembling a flat cable winding device which is a method of assembling the flat cable winding device according to claim 2, comprising:

attaching the energizing member to the lower surface of the rotation table and attaching the rotation table to the base plate;

then, assembling and fixing the tubular wall body to the base plate;

in this state, rotating the rotation table in a direction opposite to the winding direction to store an energizing force in the energizing member;

attaching the plurality of guide rollers on the rotation table; an winding the flat cable around the guide rollers.

* * * * *